June 10, 1947.                M. RONNING ET AL                2,422,044
                                TRACTOR MOWER
                    Filed Sept. 1, 1944            7 Sheets-Sheet 3
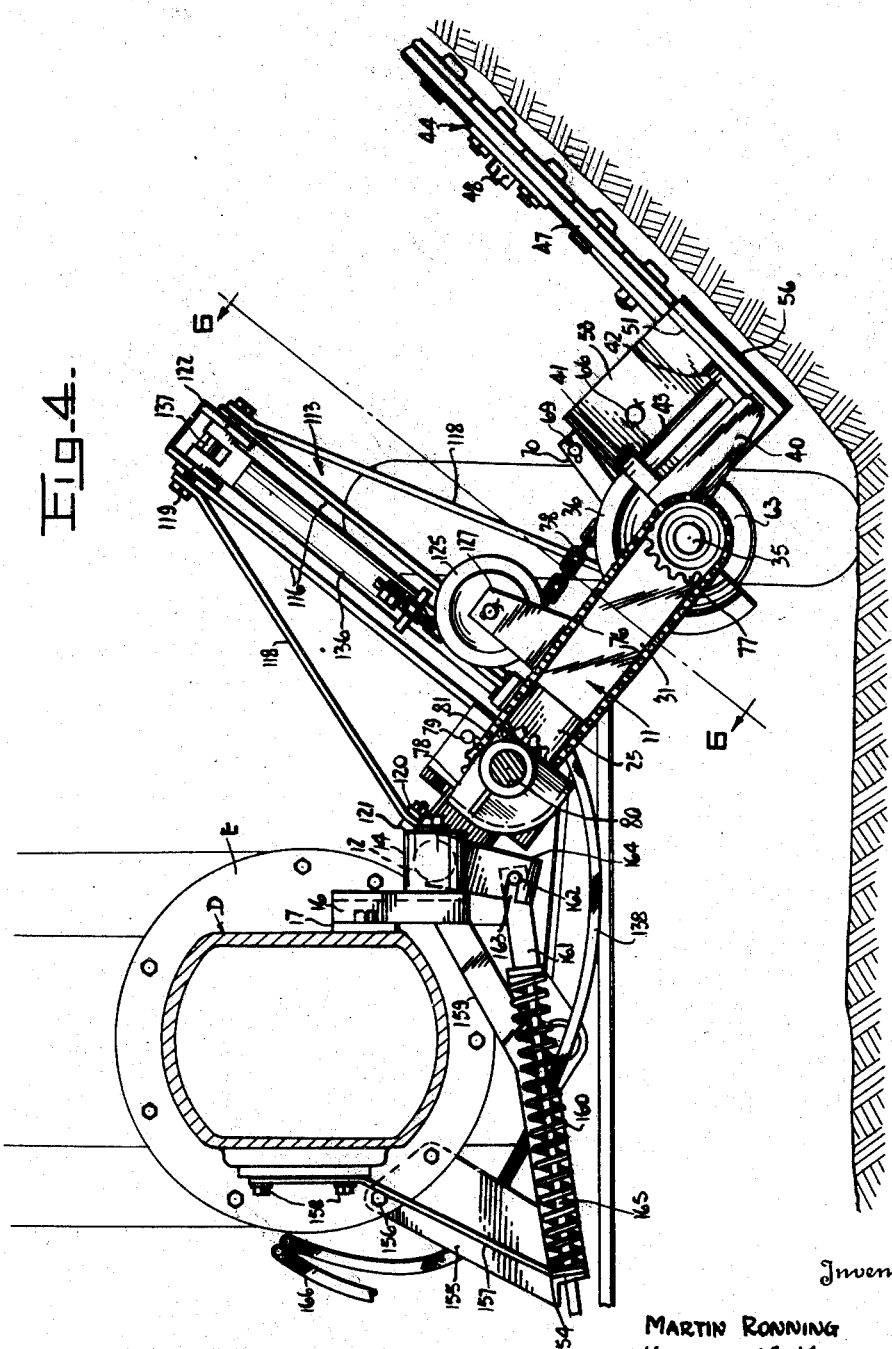
Inventors
MARTIN RONNING
KENNETH M. KEITH
By Carlsen + Hagle
                Attorneys

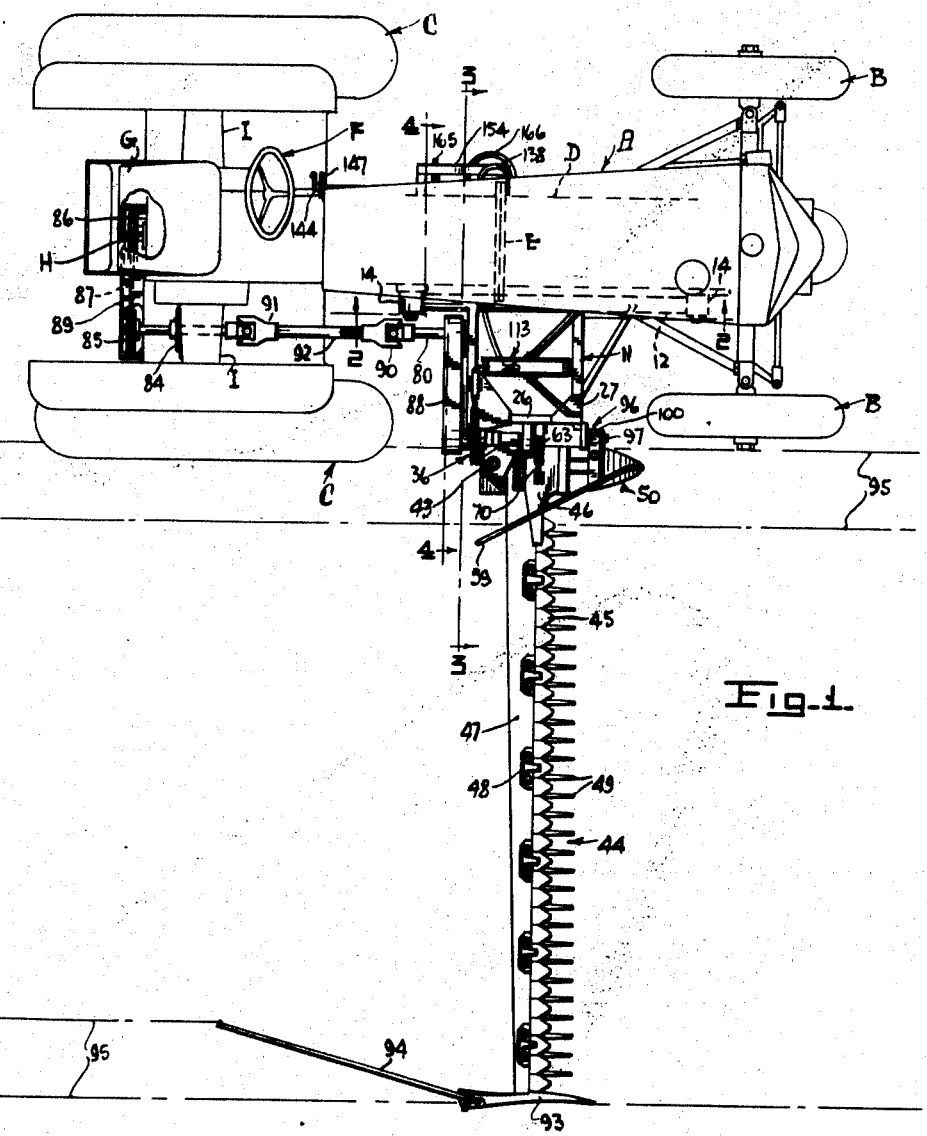

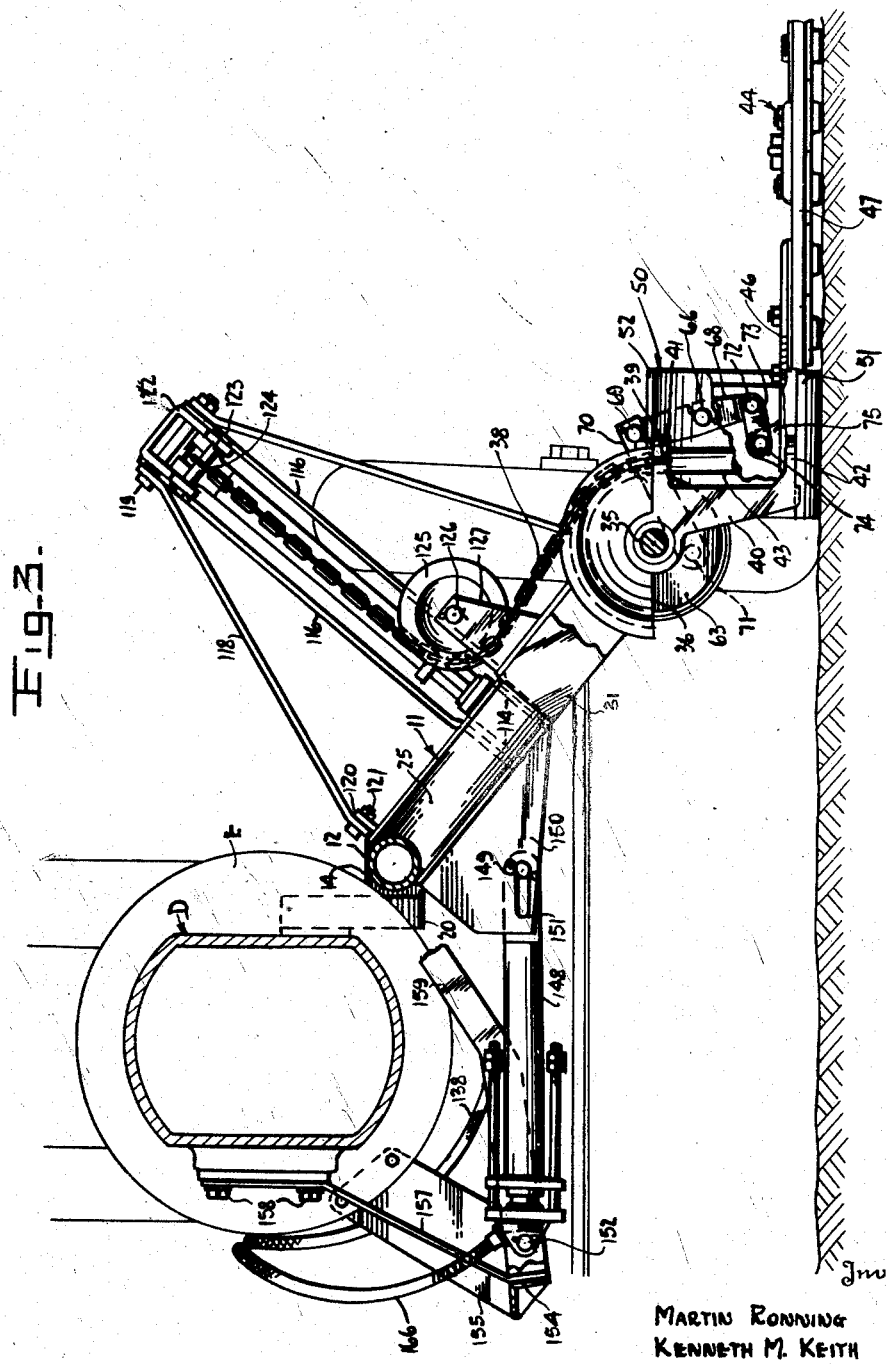

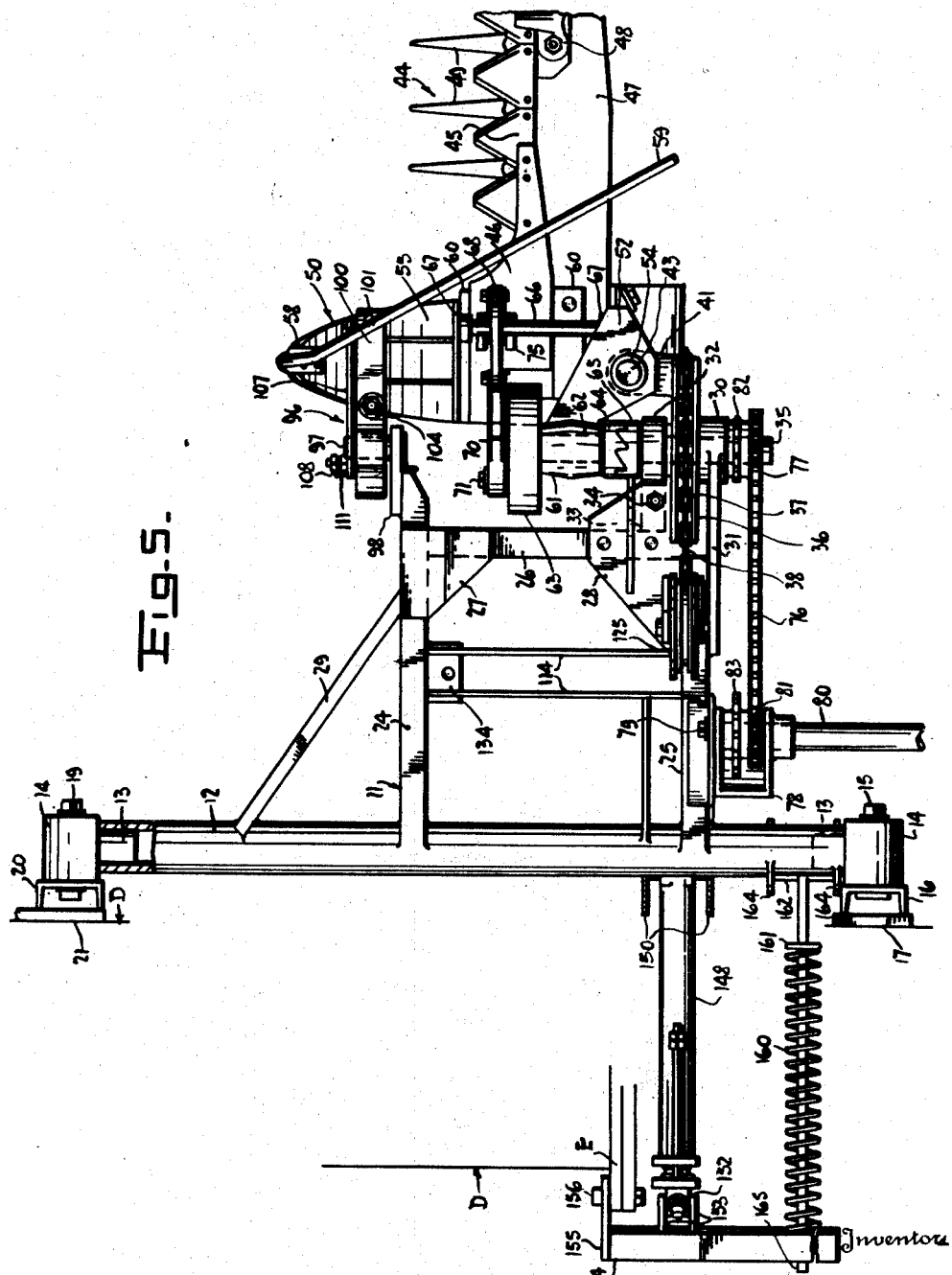

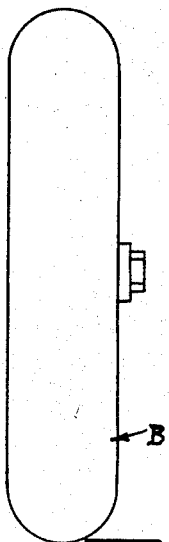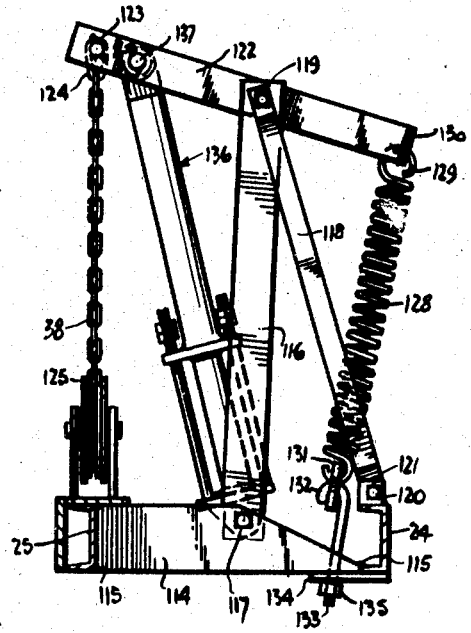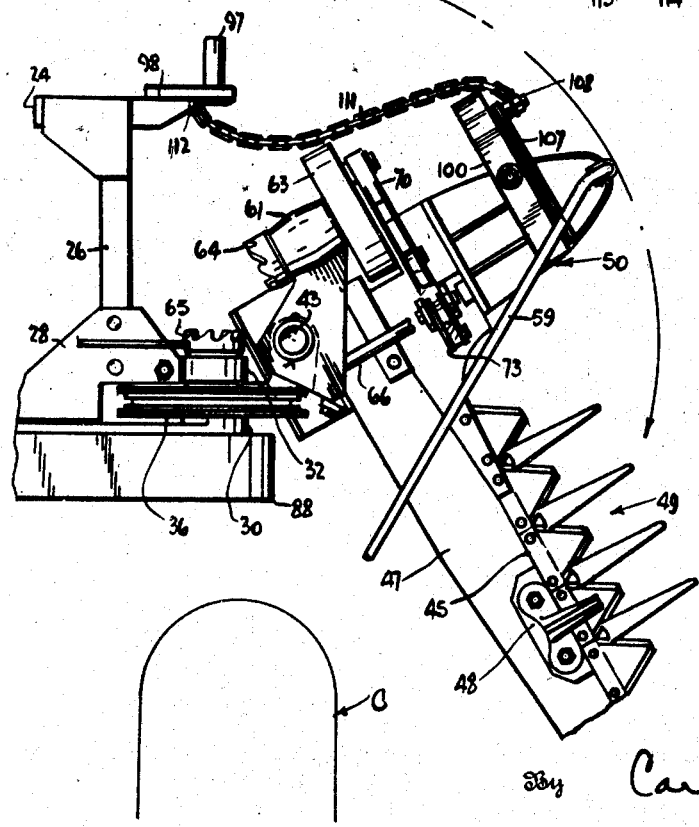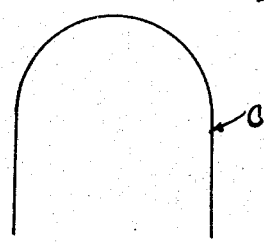

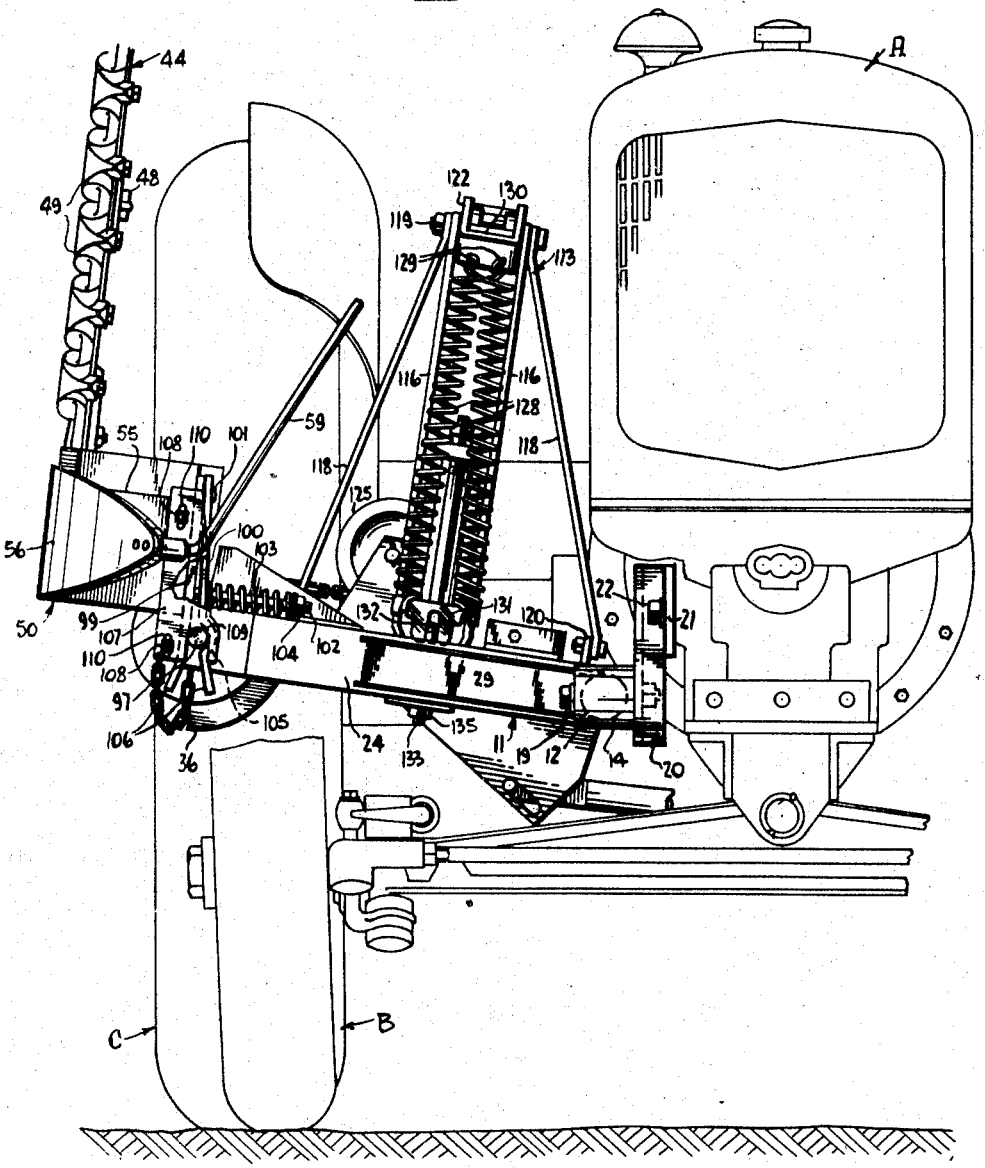

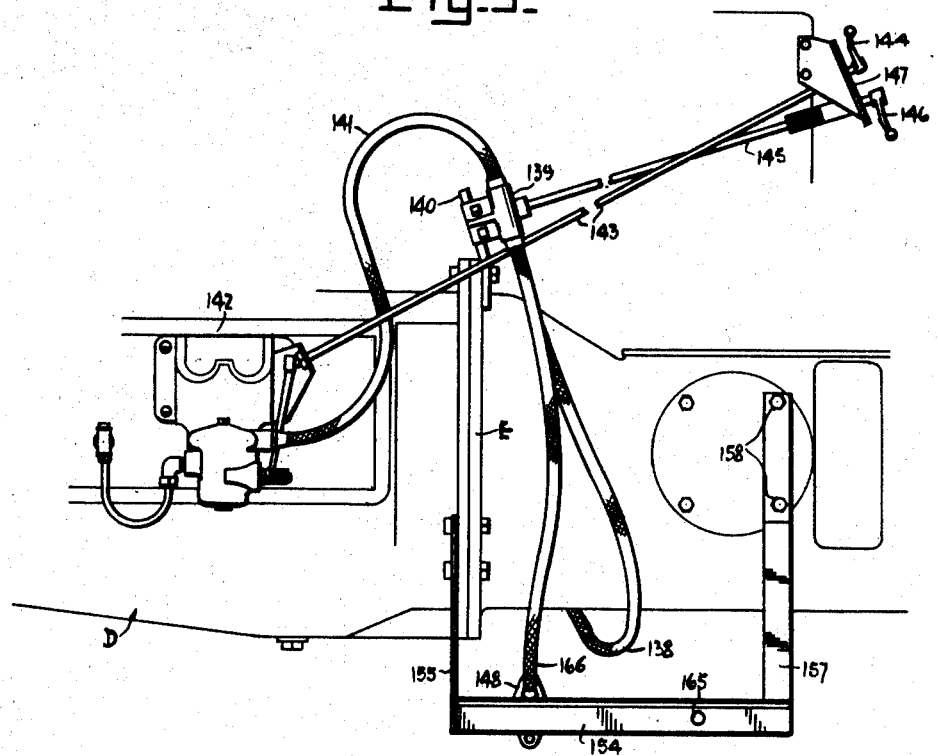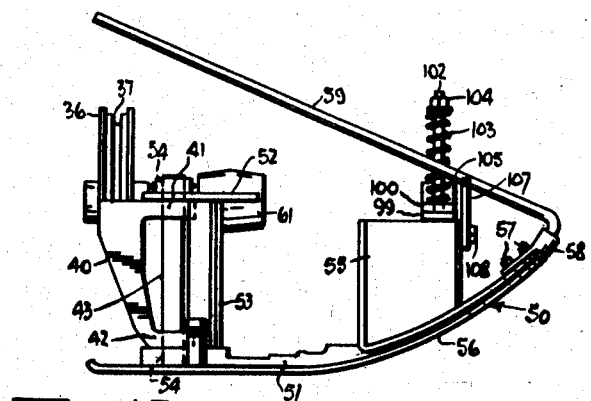

Patented June 10, 1947

2,422,044

UNITED STATES PATENT OFFICE 2,422,044

TRACTOR MOWER

Martin Ronning, St. Louis Park, and Kenneth M. Keith, Minneapolis, Minn., assignors to Minneapolis-Moline Power Implement Company, Minneapolis, Minn., a corporation of Delaware Application September 1, 1944, Serial No. 552,248

22 Claims. (Cl. 56—25)

This invention relates to improvements in tractor mowers or power mowers of the type adapted to be mounted on and powered by a tractor.

The primary object of this invention is to provide a mower of this kind of practical efficient and durable construction and which may be readily mounted upon a conventional tractor. Another object is to provide a mower having a wide range of adjustment so that it may be adapted to cutting at any angle normally encountered when mowing highway shoulders and similar slopes. Another object is to provide a mower in which all lifting and tilting adjustments are power actuated and conveniently controllable. Still another object is to provide a mower having an improved cutter or sickle drive mechanism which not only facilitates cutting at any required angle but makes possible the use of a narrow inner shoe which will nicely ride the cleared strip of a previously mowed swath formed by the grass board and will facilitate maintenance of a selected cutting height. Still a further object is to provide a safety release of simple and positive nature which will enable the cutter to swing back as it encounters an obstruction in its path and prevent breakage of parts.

These and other more detailed and specific objects will be disclosed in the course of the following specification, reference being had to the accompanying drawings, in which—

Fig. 1 is a plan view of the mower and tractor, with certain parts broken away to better disclose the drive mechanism.

Fig. 2 is a side elevation, partly in section, taken substantially along the line 2—2 in Fig. 1, with brace 29 omitted.

Fig. 3 is an enlarged vertical cross sectional view along the line 3—3 in Fig. 1, only a part of the tractor being shown.

Fig. 4 is a similar view taken along the line 4—4 in Fig. 1 and in this case showing the cutter swung upwardly at an angle for cutting along an upwardly sloping surface alongside the path of the tractor.

Fig. 5 is a plan view of the structure shown in the preceding two views but with the cutter tilting mechanism omitted.

Fig. 6 is a sectional view along the line 6—6 in Fig. 4 showing the cutter tilting mechanism.

Fig. 7 is a fragmentary plan view similar to Fig. 5 but showing the cutter released and swung back due to an encounter with an obstruction and resulting operation of the safety release.

Fig. 8 is a frontal elevation of the mower structure and adjacent parts of the tractor, the mower being in transport position.

Fig. 9 is a fragmentary side elevation of the tractor, on the side opposite the mower itself, and showing certain parts of the mower operating and lifting mechanisms.

Fig. 10 is a side elevation of the inner shoe of the mower and certain connected parts.

Referring now more particularly to the drawing, A designates generally a tractor of conventional form having dirigible front wheels B and rear traction wheels C and of course the usual engine and transmission parts, the latter including a transmission housing, designated at D which includes as a part thereof a substantially circular pair of flanges E, commonly called the bolt circle. The front wheels are steered by a steering wheel F, located convenient to the operator's station G, and the tractor includes the conventional power take-off shaft H, located rearwardly of the axle I connecting the traction wheels C.

Our improved mower structure includes a main supporting frame, designated generally at 11 which is supported between the front and rear wheels B and C on one side of the tractor upon a tubular lifting roll 12, which is positioned alongside the transmission housing D lengthwise of the tractor and at its forward and rear ends is journaled upon pins 13 carried by bearing members 14. The rear bearing member is secured by a bolt 15 upon an upright channel 16 which carries an apertured ear 17 by which it is secured to the side of the transmission housing by means of cap screws, indicated at 18. The bolt 15 thus forms a pivot mounting for the bearing member 14 about which the roll 12 may oscillate in an upright longitudinal plane. The forward bearing member 14 is similarly mounted by a bolt 19 on an upright channel section 20 which likewise has an apertured ear 21 adapted to be secured by cap screws 22 to the side of the transmission housing. In this case the bolt 19, however, is mounted through a slot 23 formed in a generally upright position in the channel section 20 and permitting the roll 12 to be secured at any relative angular position desired with respect to the horizontal.

The frame 11 comprises as its main portions front and rear channels 24 and 25 which are welded at their inner ends in spaced relation upon the roll 12 and which extend outwardly therefrom. The outer ends of the channels 24 and 25 are rigidly connected by a cross piece 26 which is braced by a gusset plate 27 and by a mounting plate 28 to the respective channels. A diagonal brace 29 (Figs. 5 and 8) extends from the forward channel 24 to the roll 12 meeting the latter at a point rearward of the forward bearing thereof. Further bracing of this frame structure is provided by various frame parts to be later described, and it will be understood that the frame 11 as a whole may be readily oscillated in the upright transverse plane with respect to the tractor, about the axis of the roll 12 and in response to oscillating movement thereof. The outer end of the frame to which the mower itself is connected, as will be presently described, is thus seen to be arranged for up and down movements with respect to the ground.

A rear bearing 30 is secured by an attaching bar 31 to the rear side of the rear channel 25 and is supported by said bar outwardly of the channel. A forward bearing 32 is secured by its end 33 and a bolt 34 to the mounting plate 28 and is supported in forwardly spaced relation and axial alignment with the rear bearing 30. A short shaft 35 is journaled through these bearings 30 and 32 and upon this shaft between the bearings is oscillatably secured a sheave member 36 which has a semi-circular peripheral groove 37 adapted to receive a chain 38. The end link of the chain 38, designated at 39 in Fig. 3, is welded or otherwise rigidly secured to the lower or outer end of the groove 37 from which point the chain extends upwardly and inwardly around the groove and to a tilting mechanism later to be described. The sheave 36 includes an integrally formed leg portion 40 from which a pair of vertically spaced apertured pivot lugs 41 and 42 are extended and turned forwardly, as best seen in Figs. 3, 4 and 5. These apertured lugs 41 and 42 receive an upright pivot pin 43 which forms the primary point of attachment between the mower and the frame 11, as will now be described.

The mower itself comprises the conventional cutter, designated generally at 44, including a knife 45 provided at its inner end with a sickle head 46 and slidably supported upon a cutter bar 47, carrying the usual clips 48 and guards 49. The inner end of the cutter is secured to an inner shoe, designated generally at 50 and which, as best seen in Fig. 10, includes an upwardly and forwardly curving sole 51 above which, at the rear portion thereof, is supported a plate 52 by means of the upright bracket plates 53. The rear ends of the sole 51 and the plate 52 are provided with apertures 54 to receive the respective lower and upper ends of the pin 43 so that the shoe 50 may oscillate in a substantially horizontal plane about the axis of that pin. The shoe further includes a forward frame or bracket structure 55 and a lower wear plate 56 which is disposed beneath the sole 51 of the shoe, and curves upwardly and forwardly corresponding to the shape thereof. The forward ends of the sole 51 and wear plate 56 are connected by bolts 57 which also support in place a bracket 58 by which the usual rearwardly, upwardly and outwardly angled deflector rod 59 is mounted in place. The inner end of the cutter bar 47 is rigidly secured upon the upper surface of the shoe sole 51 between the brackets 53 and 55 so that the cutter and shoe 50 operate as a unit and the sickle head 46 is suitably guided, as by the guides 60, for reciprocating movement in a direction crosswise with respect to the length of the shoe.

The upper bracket plate 52 of the shoe 50 carries a bearing 61 which is supported forwardly of the bearings 30 and 32 and in axial alignment therewith. A stub shaft 62 is journaled in this bearing 61 and forwardly thereof carries an eccentric disk 63, while at its rear end it carries the forward part 64 of a clutch, the rear part 65 of which is secured to the forward end of the shaft 35. In the normal position of the cutter and shoe these clutch parts 64 and 65 operate in meshing engagement, as seen in Figs. 1 and 5, establishing a driving connection between the shafts 35 and 62. A rock shaft 66 is journaled between the front and rear bracket or frame portions 55 and 53 respectively of the shoe 50, in bearings 67, and is disposed thereby outwardly of and in parallel relation to the stub shaft 62. A rocking lever 68 is journaled intermediate its end upon the rock shaft 66 and at its upper end is pivotally connected by a pin 69 to a short pitman link 70 which extends inwardly therefrom and is pivotally mounted at 71 upon the eccentric 63. The lower end of the lever 68 is connected by a pin 72 to the outer end of a short drive link 73 which extends inwardly and is pivotally connected by a pin 74 to an ear 75 secured rigidly on the inner end of the sickle head 46. The foregoing arrangement is obviously such that rotation of the eccentric 63 will oscillate the lever 68 in an upright plane causing its lower end to move inward and outward and impart reciprocating motion to the sickle bar 45 of the cutter.

The eccentric 63 is driven for this purpose by a sprocket chain 76 disposed rearwardly of the frame 11 and trained over a sprocket gear 77 secured to the rear end of the shaft 35. Inwardly of this shaft 35 a bearing bracket 78 is secured, as indicated at 79, to the rear channel 25 of the frame and rotatably supports the forward end of a drive shaft 80. In alignment with the aforesaid sprocket gear 77 the shaft 80 carries another sprocket gear 81 over which the chain 76 is also trained. The shafts 35 and 80 further carry additional aligned sprocket gears 82 and 83, and these gears being of different relative size than the aforesaid gear 77 and 81 permit the drive ratio between the shafts 80 and 35 to be varied as may be required. The drive shaft 80 is located adjacent to the roll 12 and extends rearwardly beneath the rear axle I of the tractor through a bearing plate 84 secured thereto and is provided at its rear extremity with a pulley 85, as seen in Fig. 1. Another pulley 86 is mounted upon the power take-off shaft H in alignment with the pulley 85 and a belt 87 is trained over these pulleys so that engine rotation of the power take-off shaft will be transmitted to the drive shaft 80 and through the sprocket chain 76 to the shaft 35. So long as the clutch parts 64 and 65 remain in driving engagement then the eccentric 63 will be driven by the tractor engine. Guards 88 and 89 are provided in accordance with conventional practice about the sprockets and sprocket chain 76 and about the pulleys and the belt 87. Embodied in the drive shaft 80 is a pair of universal joints 90 and 91 and a splined connection 92 so that the front end of the drive shaft will have the required freedom for movement with respect to its rear end, occasioned by the up and down movements of the frame 11, as will presently appear.

The outer end of the mower 44 has a conventional outer shoe 93 and a rearwardly and inwardly angling grass board 94, the purpose of which is to throw the outer portion of the swath cut by the mower inward and leave a space or strip as indicated at 95 in Fig. 1 along which the inner shoe 50 may ride upon the ground when the next swath is cut.

The cutter is normally held in an out-thrust position at which the shoe 50 is disposed parallel with the direction of travel by means of a safety release mechanism, designated generally at 96. This mechanism includes a catch pin 97 which is rigidly secured to the outer extremity of the forward frame channel 24 by a bracket plate 98 and which extends forwardly therefrom in spaced relation to about in axial alignment with the shafts 35 and 62. A lower clasp bar or finger 99 is secured rigidly to an upper forward corner of the frame structure 55 of the shoe 50 and extends inwardly therefrom in position to nicely slip under the pin 97 in the normal position of the shoe. An upper clasp bar or finger 100 is positioned upon the lower bar 99 and likewise extends inwardly from the shoe to slip over the upper side of the pin 97. This bar 100 is loosely mounted at its outer end by a bolt 101 and adjacent its inner end a bolt 102 extends upwardly from bar 99 loosely through the bar 100 and supports an expansion coil spring 103 which is braced between the bar and a nut 104 on the upper end of the bolt. The spring 103 thus yieldably urges the inner end of the clasp bar 100 in a downward direction so that it bears with considerable pressure on the upper surface of the pin 97, and at the point where the bar 100 thus engages the pin it is arcuately formed or hooked, as indicated at 105 in Fig. 8, so that under influence of the spring the bar will effect a secure grasp upon the pin. It will thus be seen that the shoe will be anchored rigidly under all normal conditions with respect to the pin 97, holding the shoe in proper alignment and resisting any outwardly swinging movement of the forward end of the shoe such as will be caused by the drag upon the cutter 44. The inner ends of both the bars 99 and 100 are angled apart, as indicated at 106 in Fig. 8, to a distance wider than the diameter of the pin 97, to facilitate entrance of the pin between the bars after operation of the safety release in the manner which will be presently set out. A stop plate 107 is secured by bolts 108 to the forward side of the shoe bracket 55 and at its inner end this plate has a notch 109 adapted to fit the pin 97 forwardly of the latch bars 99 and 100. The bolts 108 pass through slots 110 in the plate 107 so that it may be adjusted with respect to the shoe in an inward direction to limit the swinging movements of the shoe with respect to the pin and to assure perfect alignment between the rock shaft 66 and the shaft 62 and all driving connections connected therewith. A short length of chain 111 is rigidly connected at one end, as by welding one of its links 112, to the outer extremity of the frame channel 24, and at its other end the chain is secured to the plate 107 by fastening one of its links under the innermost bolt 108, as best seen in Fig. 7. The chain will hang slack when the shoe is in normal position as shown in Fig. 8.

Mounted on the frame 11 is a mower tilting mechanism, designated generally at 113, and to support this mechanism the frame 11 is provided with a pair of parallel bars 114 extending lengthwise in the frame and secured at their respective forward and rearward ends to the channels 24 and 25 by welds, indicated at 115 in Fig. 6. Two spaced side bars 116 are bolted to the bars 114 near their centers, by a cross bolt 117, and the bars 116 extend upwardly and are braced against movements in any direction by angular brace bars 118 bolted at 119 to upper ends of the bars 116 and extending respectively inwardly and outwardly therefrom to lugs 120 welded on the forward frame channel 24, to which the lower ends of the bars 118 are secured by bolts 121. A U-shaped tilting arm 122 is disposed between upper ends of the bars 116 and is fulcrumed intermediate its ends upon the bolts 119 for up and down movements at its rear end with respect to the frame 11. At said rear end of the arm 122 a pin 123 is provided and the other end of the aforesaid chain 38 is connected by a link 124 thereto. From this point the chain 38 extends downwardly and then forwardly beneath a pulley 125 journaled on a pin 126 between spaced brackets 127 welded to the rear frame channel 25. This pulley 125 has a peripheral groove suitable to receive and guide the chain 38 and the chain is thus tautly stretched between the pin 123 at the one end and the forward end of the groove 27 and the sheave member 36 at its other end. The forward end of the arm 122 is yieldably urged downwardly by a pair of retractile coil springs 128. Upper ends of these springs are hooked at 129 to the bight 130 of the arm and at their lower ends they are hooked to an attaching plate 131 which engages the hooked upper end 132 of a bolt 133, which extends downwardly between forward ends of the bars 114 and passes through a suitably apertured anchor plate 134 welded to the undersides of these bars. A nut 135 on the lower end of the bolt 133 permits the tension of the springs 128 to be readily adjusted, as will be apparent.

For tilting the arm 122 we provide a conventional hydraulic jack, designated generally at 136, having its lower end pivotally mounted upon the bolt 117 which anchors the bars 116, and its upper end pivotally attached by a pin 137 to the rear end of the arm 122, slightly forward of the pin 123. The jack 136 operates to increase the distance between the bolt 117 and pin 137 in response to the admission of fluid, and such action will of course elevate the rear end of the arm 122. Fluid for the operation of the jack 136 is provided by a flexible line 138 which is connected to the lower end of the jack and extends across beneath the tractor to the opposite side of the crank case D, where the line is connected to a two-way valve 139, of conventional form, supported by a bracket 140 upon the bolt circle E. Fluid under pressure is supplied to the valve 139 through a line 141 leading to a pump 142 mounted on the side of the crank case and operating under control of a rearwardly directed rod 143 and a hand lever 144 to take oil from the crank case of the engine and deliver it under pressure for operation of the jack. The pump 142 is similar to that disclosed in the Victor N. Albertson Patent No. 2,264,560, issued December 2, 1941, to which patent attention is invited for a more complete disclosure of the pump itself. The valve 139 is operated by a control rod 145 which extends rearward therefrom and is provided with a control lever 146. The respective control levers 144 and 146 are arranged upon a dial 147, which is best seen in Fig. 1, which is supported adjacent to the operator's station G for convenient manipulation by the operator of the tractor.

The roll 12 is oscillated by and under control of another hydraulic jack, designated generally at 148, which at one end is connected by a pin 149 to a pair of bracket plates 150 secured rigidly to the roll 12 and adjacent parts of the frame 11. Said bracket plates depend below the roll, and the pin 149 is disposed in transversely extending slots 151 in lower and inner corners of the plates. The jack 148 extends then inwardly and across beneath the crank case D of the tractor to the side thereof opposite that upon which the roll 12 is located, and the other end of the jack is pivotally mounted by pin 152 between a pair of ears 153 carried upon the inner side of a mounting angle 154. Said angle 154 is disposed longitudinally with respect to the crank case D and is supported at its front end by a hanger plate 155 bolted at 156 to the bolt circle E, while at its rear end the angle is supported by hanger strap 157, bolted at 158 to an appropriate point on the crank case side. A brace 159 also extends from this rear end of the angle 154 back beneath the crank case D, and is bolted to the rear channel 16. The angle 154 is thus supported rigidly against movement toward or away from the lifting roll 12 so that the admission of fluid to the jack 148 will result in the exertion of a force upon the lifting roll tangent to the axis thereof and in an upward and outward direction such as to cause the roll to rotate in a counterclockwise direction, as viewed in Figs. 3 and 4. Thus the expansion of the jack 148 will cause the frame 11 to swing upwardly at its outer end, carrying the cutter 44 upwardly from the ground and vice versa. The pin 149 will of course normally rest in the forward outer ends of the slots 151 due to the weight of the frame 11 and connected parts, but the slots permit limited upward floating movements of the frame 11 and the mower independent of the jack, and to assist and balance the weight for such floating motion an expansion coil spring 160 is braced between the angle 154 and an attaching member 161 which carries a pin 162 disposed in notches 163 in a pair of spaced depending plates 164. Said plates 164 are welded to the roll 12 and depend therefrom so that the spring 160 thus positioned will extend across beneath the transmission housing D and will exert an upward lifting force upon the roll 12 and its assorted parts. Thus the spring 160 will assist the jack 148 in lifting the mower and will provide limited floating action of the mower and more particularly of the shoe 50 when the same encounters inequalities of the ground surface over which it is traveling. The spring 160 is supported upon a rod 165 extending from the attaching member 161 out through angle 154, as clearly shown in Fig. 4.

The jack 148 is supplied with fluid for its operation through a line 166 which extends from the end of the jack to the aforesaid two-way valve 139. The operation of this valve 139 is such as to connect the supply line 141 with either of the lines 138 or 166 leading to the jacks 136 or 148, thus permitting selective operation of the jacks at the will of the operator.

*Operation*

In the operation of the mower upon level ground, as seen in Fig. 3, the frame 11 will be inclined downwardly and outwardly while the shoe 50 and the cutter 44 will stand at an angle with respect to the frame 11 such that they will extend out horizontally or laterally from the tractor. The operation of the drive shaft 80 from the power take-off shaft H, as previously described, will then result in the operation of the eccentric 63 to oscillate the lever 68 and reciprocate the sickle bar 45 as required for the normal operation of the mower. The cutting level of the shoe 50 and cutter 44 may be readily adjusted in accordance with requirements by operating the jack 148 to raise or lower the frame 11 at its outer end, and making necessary tilting adjustments to restore the cutter to a level position if needed.

Likewise the angle of the mower 44 and of the shoe 50 with respect to the horizontal may be as readily adjusted by operating the jack 136 to pull up or slack off the chain 38. The former action will result in a pull being exerted by the chain 38 upon the sheave member 36 such as to oscillate it about the shaft 35, and inasmuch as this sheave member, through the pin 43, forms the main support for the shoe 50, such action will be transmitted thereto in such manner as to swing the shoe and the cutter upwardly in an upright transverse plane with respect to the tractor. This movement being carried out about the axis of the shaft 35 as an axis, it will further be apparent that the angular relationship between the shoe and the frame 11 will have no effect upon the operation of the drive mechanism for the sickle; this for the reason that the pitman link 70 and the eccentric 63 also operate about the same axis. Thus it will be seen that cutting can be carried out with the mower unit at any angle with respect to the horizontal, and for example the cutter is shown in Fig. 4 as inclined upwardly and outwardly at a sharp angle such as may be necessary for cutting an upwardly sloping road shoulder. The cutter may also be turned downwardly and outwardly by slacking off on the chain 138, if required, and will operate entirely freely through a wide range of adjustment in this plane. Operation of the jack 136 may be conveniently controlled to set the cutter at any angle and due to the flexibility of the chain 138 a further floating effect is achieved through the influence of the springs 128, as will be apparent. As seen in Fig. 8, the frame 11 may be raised to or above the horizontal position, and the cutter 44 and shoe 50 then tilted upwardly to a substantially upright position whereat the mower structure may be readily transported without adding much, if any, to the overall width and clearance of the tractor itself. The shoe and cutter may be angled upwardly and downwardly at forward edges as desired by adjusting the forward roll bearing in the slot 23.

In any operating position of the cutter the release mechanism for the shoe 50 will permit the cutter 44 to swing rearward should it encounter an obstruction in its path, as indicated in Fig. 7. Normally the tension of the spring 103 will be so adjusted that the clasp bar 100 will grip the pin 97 with sufficient force to hold the shoe in alignment with its direction of travel, but the increased drag or resistance upon the cutter when it strikes an obstruction will exert a sufficient force in outward direction to pull the clasp bars out of engagement with the pin. The shoe 50 and of course the cutter 44 then become free to swing about the axis of the pin 43 and they may swing clear back alongside the wheel C of the tractor or until such movement is halted by the chain 111 becoming taut. It will be noted also that when the shoe thus swings outwardly the forward clutch part 64 is carried outward out of engagement with the rear clutch part 65 so that when the cutter is released the drive connection thereto will also be disconnected, preventing any damage to the cutting parts. After the obstruction is removed, the cutter may be readily swung forward by hand until the clasp bars reengage the pin 97, at which time the driving connection between the cross parts 64 and 65 will be re-established. This movement of the shoe 50 is limited by the engagement of the notch 109 in the plate 107 with the pin 97, so that not only is perfect alignment of the operating parts assured, but any binding effect between the clutch parts 64 and 65 is prevented.

Attention is called to the fact that the shoe 50 is comparatively narrow and the entire drive mechanism represented by the eccentric 63, lever 68, and link 73 occupies very little space in the transverse plane. The shoe is thus well adapted to ride along the cleared strip or path 95 of a previously cut swath, as indicated in Fig. 1, so that accurate and close cutting can be obtained.

The use of a wide shoe, such as would be required with the usual long pitman structure, at this point would obviously require that the shoe ride along the ridge of cut material thrown inward by the grass board 94, when each preceding swath was cut, with a resulting difficulty in close, even cutting.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A tractor mower, comprising a frame, means supporting the frame at its inner end on the tractor for swinging movements about an axis extending longitudinally of the tractor, said frame being also supported by said means for angling adjustments about an axis extending transversely with respect to the tractor, a cutter pivotally supported at the outer end of the frame for up and down swinging movement with respect thereto, and means connected to the frame and cutter for swinging the frame and the cutter with respect to the tractor and with respect to each other.

2. A tractor mower, comprising a frame, means supporting the frame at its inner end on the tractor for swinging movements about an axis extending longitudinally of the tractor, said frame being also supported by said means for angling adjustments about an axis extending transversely with respect to the tractor, a cutter pivotally supported at the outer end of the frame for up and down swinging movements with respect thereto, and a power actuated member supported on the frame and operatively connected to the cutter for tilting the same with respect to the frame.

3. A tractor mower, comprising in combination, a frame supported on the tractor and extending outwardly laterally therefrom, a cutter unit having a pivot connection to the outer end of the frame and normally extending outward laterally from the frame, said pivot connection providing for swinging movement of the cutter unit with respect to the frame about an upright axis and permitting the cutter unit to swing rearwardly from said normal position as it encounters an obstacle in its path, strain release means normally engaging and restraining the cutter against such rearward swinging movements, and a drive mechanism for the cutter unit including a clutch mechanism having one part carried by the frame and another part carried by the cutter unit operatively arranged to be physically disengaged from each other by rearward swinging movement of the cutter.

4. A tractor mower, comprising in combination, a frame swingably connected at one end to the tractor and extending outwardly therefrom for up and down movements at its outer end, a pair of shafts disposed in axial alignment at the outer end of the frame, disengageable clutch elements connecting the proximate ends of the shafts, a cutter having an inner shoe pivotally connected by an upright pivot to the frame outwardly of said shafts, one of said shafts being journaled on the frame and the other journaled on the shoe and the arrangement being such that swinging movements of the cutter with respect to the frame about said pivot will engage and disengage said clutch elements, means for driving the shaft supported by the frame, and cutter operating means operated by the shaft journalled on the shoe.

5. In a tractor mower, a lifting roll oscillatably supported along one side of the tractor and a frame extending laterally therefrom for up and down movements at its outer end responsive to oscillating movements of said roll, a cutter supported from said outer end of the frame, a hydraulic jack connected to said roll and extending beneath the tractor to the other side thereof, a balance spring also connected to the roll and extending beneath the tractor to said other side thereof, and a bracket structure secured to said other side of the tractor and supporting the jack and spring.

6. In a tractor mower, a frame, means supporting the frame on the tractor for up and down movements with respect thereto, a cutter connected to the frame and tiltable about a longitudinal axis with respect to the tractor, a tilting mechanism including a lever swingably supported by the frame, a hydraulic jack for swinging the lever, a flexible connection between the lever and the cutter operative to tilt the cutter in response to swinging movements of the lever, and spring means connected to the lever and yieldably opposing downward tilting movements of the cutter.

7. In a tractor mower, a frame extending laterally from one side of the body of the tractor for up and down movement about a pivot connection at its inner end with the tractor body, a cutter pivotally carried by the outer end of the frame for adjustment with respect thereto about a fore and aft extending axis, and means for raising and lowering said frame including a power element and a counterbalancing element both extending from the frame transversely under the tractor body and anchored to the other side thereof.

8. In a tractor mower, a frame extending laterally from one side of the body of the tractor for up and down movement about a pivot connection at its inner end with the tractor body, a cutter pivotally carried by the outer end of the frame for swinging adjustment with respect thereto, and means for raising and lowering said frame including a power element and a counterbalancing element both extending from the frame transversely under the tractor body and anchored to the other side thereof, said power element having a lost motion connection with the frame.

9. In a tractor mower, a frame pivoted to the tractor and extending laterally therefrom for adjustment about a fore and aft extending axis, a cutter bar pivoted to the outer end of the frame for vertical adjustment, a hydraulic jack connected at one end to the frame and at the other end to the tractor to adjust the frame, and a lost motion connection between the hydraulic jack and the frame permitting the latter to move upwardly from a predetermined position irrespective of adjustment of the jack.

10. In a tractor mower, a frame pivoted to and extending outwardly from one side of the tractor body for vertical adjustment with respect to the tractor, a cutter carried by the outer end of the frame, a hydraulic jack extending from the frame under the tractor body and anchored at a point at the other side of the tractor body for raising and lowering the frame and cutter.

11. In a tractor mower, a frame pivoted to and extending outwardly from one side of the tractor body for up and down adjustment at its outer end, a cutter carried by the outer end of the frame, a hydraulic jack extending from the frame under the tractor body and anchored at a point at the other side of the tractor body for raising and lowering the frame and cutter, said jack having a lost motion connection at one end permitting adjustment of the frame independently of the jack.

12. In a tractor mower, a frame pivoted to and extending outwardly from one side of the tractor body for vertical adjustment at its outer end, a cutter carried by the outer end of the frame, a bracket extending downwardly from the other side of the tractor body, and a fluid actuable device connecting the frame with said bracket.

13. In a tractor mower, a frame pivoted to and extending outwardly from one side of the tractor body for vertical adjustment at its outer end, a cutter carried by the outer end of the frame, a bracket extending downwardly from the other side of the tractor body, means supported by the tractor for raising and lowering the frame, and a counterbalancing device extending from the bracket under the tractor body to the frame.

14. In a tractor mower, a frame extending laterally from the tractor and attached thereto by connections permitting the frame to be adjusted about a fore and aft extending axis, and a mower carried by the outer end of the frame and being adjustable with respect thereto about a fore and aft extending axis, said frame connections with the tractor being adjustable whereby the entire frame and said mower may be tiltably adjusted simultaneously about a transversely extending axis.

15. In a tractor mower, a frame extending laterally from the tractor and pivoted thereto for swinging adjustment about a fore and aft extending axis, a mower unit extending outwardly from the frame and mounted for vertical and horizontal swinging movement with respect thereto, means for releasably restraining the mower unit against horizontal movement from its normal operative position with respect to the frame, a pair of normally engaged clutch elements, one carried by the mower unit to operate the same, and the other carried by the frame, power take-off means connected with the tractor engine for driving the clutch element carried by the frame irrespective of the vertically adjusted position of the latter, and means operated by movement of the mower unit when released from its normal operative position and moved rearwardly to physically disengage the clutch elements, whereby the clutch element on the adjustable frame may continue to rotate without operating the mower.

16. In a tractor mower, a frame pivoted to and extending laterally of the tractor, a mower unit pivoted to the outer end of the frame for movement about a fore and aft extending axis, a lever fulcrumed on the frame, a hydraulic jack mounted on the frame and directly connected to the lever to operate the same, and connections between the lever and said mower unit for adjusting the latter vertically with respect to the frame in response to hydraulic actuation of the lever.

17. In a tractor mower, a frame pivoted to and extending laterally of the tractor, a mower unit pivoted to the outer end of the frame for vertical swinging movement with respect thereto, a lever fulcrumed on the frame, a hydraulic jack mounted on the frame and directly connected to the lever to operate the same, and connections between the lever and said mower unit for adjusting the latter vertically in response to hydraulic actuation of the lever, said connections including a flexible element attached at one end to the lever and at the other end to the mower unit.

18. In a tractor mower, a frame pivoted to and extending laterally of the tractor, a mower unit pivoted to the outer end of the frame for vertical swinging adjustment, a lever fulcrumed on the frame, a hydraulic jack mounted on the frame and directly connected to the lever to operate the same, and connections between the lever and said mower unit for adjusting the latter vertically in response to hydraulic actuation of the lever, said connections including a flexible element and rotary guide means therefore.

19. In a tractor mower, a frame pivoted to and extending laterally of the tractor, a mower unit pivoted to the outer end of the frame for vertical swinging adjustment, a lever fulcrumed on the frame, a hydraulic jack mounted on the frame and directly connected to the lever to operate the same, and connections between the lever and said mower unit for adjusting the latter vertically in response to hydraulic actuation of the lever, said connection including a flexible element, and a rotary guide movable on an axis coincident with that of the pivot connection of the mower unit to the frame.

20. In a tractor mower, a frame pivoted to and extending laterally of the tractor, a mower unit pivoted to the outer end of the frame for swinging movement in a vertical plane extending transversely with respect to the direction of travel, a lever fulcrumed on the frame, for movement in a generally fore and aft extending plane perpendicular to the frame, means for actuating the lever, and operative connections between the lever and mower unit.

21. In a tractor mower, a frame pivoted to and extending laterally of the tractor, a mower unit pivoted to the outer end of the frame for vertical adjustment with respect thereto, a lever fulcrumed on the frame, for movement in a generally fore and aft extending plane perpendicular to the frame, a hydraulic device for actuating the lever, and flexible means connecting the lever to the mower unit.

22. In a tractor mower, a frame pivoted to and extending laterally of the tractor, a mower unit pivoted at its inner end to the outer end of the frame for vertical swinging adjustment at the outer end of the mower unit, a lever fulcrumed on the frame for movement in a generally fore and aft extending plane perpendicular to the frame, a hydraulic device for actuating the lever, means operatively connecting one end of the lever to the mower unit, and a counterbalance spring connecting the other end of the lever to the frame.

MARTIN RONNING.
KENNETH M. KEITH.

REFERENCES CITED

The following references are of record in the file of this patent:

UNITED STATES PATENTS

| Number | Name | Date |
| --- | --- | --- |
| 1,973,993 | Pearson | Sept. 18, 1934 |
| 2,328,838 | Oberlink | Sept. 7, 1943 |
| 1,887,352 | Huddle | Nov. 8, 1932 |
| 1,908,555 | Rawls | May 9, 1933 |
| 2,130,795 | Gollnick | Sept. 20, 1938 |
| 2,269,980 | MacDonald | Jan. 13, 1942 |
| 2,304,421 | Rogers | Dec. 8, 1942 |
| 2,310,388 | Blair | Feb. 9, 1943 |
| 2,329,881 | Clapper | Sept. 21, 1943 |